US009967658B2

(12) United States Patent
Kim et al.

(10) Patent No.: US 9,967,658 B2
(45) Date of Patent: May 8, 2018

(54) METHOD FOR PROCESSING SOUND BY ELECTRONIC DEVICE AND ELECTRONIC DEVICE THEREOF

(71) Applicant: Samsung Electronics Co., Ltd., Gyeonggi-do (KR)

(72) Inventors: Jun-Tai Kim, Gyeonggi-do (KR); Min-Ho Bae, Seoul (KR); Hyun-Min Choi, Chungcheongbuk-do (KR); Han-Ho Ko, Gyeonggi-do (KR); Gang-Youl Kim, Gyeonggi-do (KR); Jae-Mo Yang, Gyeonggi-do (KR); Chul-Min Choi, Seoul (KR); Beak-Kwon Son, Gyeonggi-do (KR); Nam-Il Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days. days.

(21) Appl. No.: 15/187,271

(22) Filed: Jun. 20, 2016

(65) Prior Publication Data
US 2017/0055072 A1 Feb. 23, 2017

(30) Foreign Application Priority Data
Aug. 21, 2015 (KR) .................. 10-2015-0118088

(51) Int. Cl.
*H04R 1/40* (2006.01)
*H04N 5/232* (2006.01)
(Continued)

(52) U.S. Cl.
CPC .............. *H04R 1/406* (2013.01); *G06F 3/01* (2013.01); *H04N 1/2112* (2013.01);
(Continued)

(58) Field of Classification Search
CPC ......... B60R 2001/1253; B60R 11/0247; B60R 2001/1223; B60R 2011/0294;
(Continued)

(56) References Cited

U.S. PATENT DOCUMENTS 8,150,063 B2 * 4/2012 Chen .................. H04R 3/005
381/122
8,401,178 B2 * 3/2013 Chen .................. G10L 21/0208
379/406.02
(Continued)

FOREIGN PATENT DOCUMENTS

EP 2 031 905 3/2009
EP 2 882 170 6/2015
(Continued)

OTHER PUBLICATIONS

International Search Report dated Oct. 31, 2016 issued in counterpart application No. PCT/KR2016/008294, 8 pages.
(Continued)

*Primary Examiner* — Trung Diep
(74) *Attorney, Agent, or Firm* — The Farrell Law Firm, P.C.

(57) ABSTRACT

An electronic device is provided. The electronic includes a camera module and a processor configured to capture at least one image of an object using the camera module, obtain a sound using a microphone operably connected to the processor when the at least one image is captured, determine whether the sound is related to the object, when the sound is determined to be unrelated to the object, change at least one attribute of the sound and store the changed at least one attribute of the sound.

20 Claims, 12 Drawing Sheets

(51) Int. Cl.
  *H04R 3/00* (2006.01)
  *H04N 1/21* (2006.01)
  *G06F 3/01* (2006.01)
  G06K 9/00 (2006.01)
  H04R 5/027 (2006.01)

(52) U.S. Cl.
  CPC ......... *H04N 5/232* (2013.01); *H04N 5/23219* (2013.01); *H04R 3/005* (2013.01); *G06K 9/00255* (2013.01); *H04R 5/027* (2013.01); *H04R 2400/01* (2013.01); *H04R 2430/20* (2013.01); *H04R 2499/11* (2013.01); *H04S 2400/15* (2013.01)

(58) Field of Classification Search
  CPC ........ B60R 2300/103; B60R 2300/406; H04R 2410/07; H04R 3/005; H04N 5/23258
  See application file for complete search history.

(56) References Cited

U.S. PATENT DOCUMENTS

| | | |
|---|---|---|
| 2006/0120541 A1 | 6/2006 | Bhandare |
| 2007/0195986 A1 | 8/2007 | Geaves |
| 2008/0075298 A1 | 3/2008 | Mod |
| 2009/0129620 A1* | 5/2009 | Tagawa ................. H04R 3/005 381/364 |
| 2011/0317041 A1 | 12/2011 | Zurek |
| 2012/0078624 A1 | 3/2012 | Yook |
| 2012/0320143 A1* | 12/2012 | Chu ......................... H04N 7/15 348/14.08 |
| 2013/0307934 A1* | 11/2013 | Densham ................ G01S 3/802 348/46 |
| 2014/0270383 A1* | 9/2014 | Pederson .......... G08B 13/19647 382/104 |
| 2015/0022636 A1 | 1/2015 | Savransky |
| 2015/0055798 A1 | 2/2015 | Moon et al. |
| 2015/0326748 A1* | 11/2015 | Tisch .................... H04R 3/005 348/231.4 |

FOREIGN PATENT DOCUMENTS

| | | |
|---|---|---|
| JP | 2007-281981 | 10/2007 |
| JP | 2008-193196 | 8/2008 |
| JP | 2013-106298 | 5/2013 |
| KR | 1996-0033032 | 9/1996 |
| KR | 10-0877269 | 12/2008 |

OTHER PUBLICATIONS

European Search Report dated Feb. 15, 2017 issued in counterpart application No. 16181106.2-1914, 7 pages.

* cited by examiner

METHOD FOR PROCESSING SOUND BY ELECTRONIC DEVICE AND ELECTRONIC DEVICE THEREOF

PRIORITY

This application claims priority under 35 U.S.C. § 119(a) to a Korean Patent Application Serial No. 10-2015-0118088, which was filed in the Korean Intellectual Property Office on Aug. 21, 2015, the entire disclosure of which is incorporated herein by reference.

BACKGROUND

1. Field of the Disclosure

The present disclosure relates generally to methods for processing sounds by electronic devices, and more particularly, to methods for processing sounds by electronic devices that include multiple microphones.

2. Description of the Related Art

Smartphones or other electronic devices come equipped with a diversity of functionality, as well as being able to accept/make calls, and efforts have been made to develop various functions of these electronic devices.

In relation to sound recording and/or video capturing, such as by a camcorder, among various functions of an electronic device, various techniques are being developed to provide a user with desired sound signals that are inputted to the electronic device. For example, diverse pre-processing techniques are under development to eliminate or reduce unnecessary signals from sound signals received at the electronic device.

Generally, a user can take video while holding the electronic device. In this instance, the user's voice signals may be inputted at a higher level than that of other voice signals. For example, referring to FIG. 13, when the user (or a photographer) video-captures an object (or a shooting target) with an electronic device, the microphone of the electronic device is typically positioned relatively closer to the user than the object. Thus, the electronic device may record the user's voice at a higher level than a voice of the object. Accordingly, imbalance in strength of voice may occur between the user and the object.

Further, when attempting to use, e.g., a beamforming algorithm to define a range for receiving sounds, a plurality of microphones for the purpose of receiving sounds oriented in a particular direction from the electronic device, the implementation of such an algorithm may be limited by the limited number of microphones in the electronic device (e.g., not enough microphones). For example, a sufficient number of microphones need to be positioned at a front or rear portion of the electronic device in order to distinguish the user's voice from the object's voice. However, providing a large number of microphones on an electronic device may not be practical in view of the limited amount of mounting space on the electronic device, design considerations, and costs associated with providing the electronic device with a large number of microphones.

SUMMARY

In accordance with an aspect of the present disclosure, there is provided an electronic device. The electronic device includes a camera module and a processor configured to capture at least one image of an object using the camera module, obtain a sound using a microphone operably connected to the processor when the at least one image is captured, determine whether the sound is related to the object, when the sound is determined to be unrelated to the object, change at least one attribute of the sound and store the changed at least one attribute of the sound.

In accordance with an aspect of the present disclosure, there is provided a method for processing a sound by an electronic device. The method includes capturing at least one image of an object using a camera operably connected to the electronic device, obtaining a sound using at least one microphone operably connected to the electronic device when the image is captured, determining whether the sound is related to the object, and when the sound is determined to be unrelated to the object, changing at least one attribute of the sound and storing the changed at least one attribute of the sound.

In accordance with an aspect of the present disclosure, there is provided a non-transitory computer-readable storage medium having thereon a program that executes a method for processing a sound by an electronic device. The method includes capturing at least one image of an object using a camera operably connected to the electronic device, obtaining a sound using at least one microphone operably connected to the electronic device when the image is captured, determining whether the sound is related to the object, and when the sound is determined to be unrelated to the object, changing at least one attribute of the sound and storing the changed at least one attribute of the sound.

BRIEF DESCRIPTION OF THE DRAWINGS

The above and other aspects, features, and advantages of certain embodiments of the present disclosure will be more apparent from the following detailed description taken in conjunction with the accompanying drawings, in which.

Throughout the drawings, like reference numerals will be understood to refer to like parts, components, and structures.

DETAILED DESCRIPTION

Figure 1:
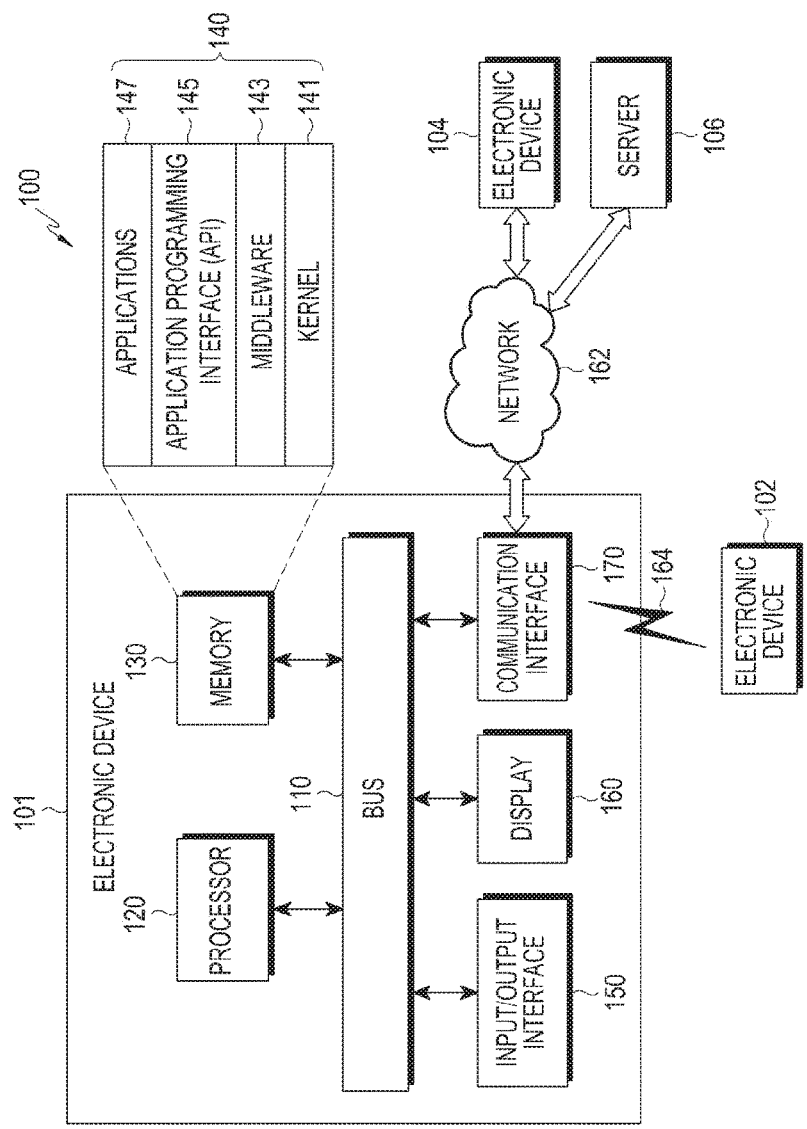
FIG. 1 illustrates an electronic device that operates in a network environment, according to an embodiment of the present disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present invention, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a CPU or an application processor) capable of performing a corresponding operation by executing one or more software programs stored in a memory device.

The term "module" as used herein may be defined as, for example, a unit including one of hardware, software, and firmware or two or more combinations thereof. The term "module" may be interchangeably used with, for example, the terms "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

Examples of an electronic device according to embodiments of the present disclosure may include at least one of a smartphone, a tablet personal computer (PC), a mobile phone, a video phone, an e-book reader, a desktop PC, a laptop computer, a netbook computer, a workstation, a PDA (personal digital assistant), a portable multimedia player (PMP), an MP3 player, a mobile medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device (e.g., an implantable circuit).

The electronic device may be a home appliance. For example, the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™ and PlayStation™), an electronic dictionary, an electronic key, a camcorder, or an electronic picture frame.

The electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller machines (ATMs), point of sales (POS) devices, or Internet of Things (IoT) devices (e.g., a light bulb, various sensors, an electric or gas meter, a sprinkler, a fire alarm, a thermostat, a street light, a toaster, fitness equipment, a hot water tank, a heater, or a boiler).

The electronic device may at least one of part of a piece of furniture or building/structure, an electronic board, an electronic signature receiving device, a projector, or various measurement devices (e.g., devices for measuring water, electricity, gas, or electromagnetic waves). The electronic device may be one or a combination of the above-listed devices. The electronic device may be a flexible electronic device. The electronic device disclosed herein is not limited to the above-listed devices, and may include new electronic devices depending on the development of new technology.

Hereinafter, electronic devices are described with reference to the accompanying drawings. As used herein, the term "user" may denote a human or another device (e.g., an artificial intelligence electronic device) using the electronic device.

Referring to FIG. 1, an electronic device 101 that operates in a network environment 100, according to an embodiment of the present disclosure, is shown. The electronic device 101 includes a bus 110, a processor 120, a memory 130, an input/output interface 150, a display 160, and a communication interface 170. The electronic device 101 may exclude at least one of the components or may add another component.

The bus 110 may include a circuit for connecting the components 110 to 170 with one another and transferring communications (e.g., control messages and/or data) between the components.

The processing module 120 may include one or more of a central processing unit (CPU), an application processor (AP), or a communication processor (CP). The processor 120 may perform control on at least one of the other components of the electronic device 101, and/or perform an operation or data processing relating to communication.

The memory 130 may include a volatile and/or nonvolatile memory. For example, the memory 130 may store commands or data related to at least one other component of the electronic device 101. The memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS).

For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example.

Further, the middleware 143 may process one or more task requests received from the application program 147 in order of priority. For example, the middleware 143 may assign at least one of application programs 147 with priority of using system resources (e.g., the bus 110, processor 120, or memory 130) of at least one electronic device 101. For example, the middleware 143 may perform scheduling or load balancing on the one or more task requests by processing the one or more task requests according to the priority assigned to the at least one application program 147.

The API 145 is an interface allowing the application 147 to control functions provided from the kernel 141 or the middleware 143. For example, the API 133 may include at least one interface or function (e.g., a command) for filing control, window control, image processing or text control.

The input/output interface 150 may serve as an interface that may, e.g., transfer commands or data input from a user or other external devices to other component(s) of the electronic device 101. Further, the input/output interface 150 may output commands or data received from other component(s) of the electronic device 101 to the user or the other external device.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user.

The communication interface 170 may set up communication between the electronic device 101 and a first electronic device 102, a second electronic device 104, or a server 106. For example, the communication interface 170 may be connected with the network 162 through wireless or wired communication to communicate with the external electronic device.

The wireless communication may be a cellular communication protocol and may use at least one of, e.g., long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). Further, the wireless communication may include, e.g., short-range communication 164. The short-range communication 164 may include at least one of wireless fidelity (Wi-Fi), Bluetooth, near-field communication (NFC), or global navigation satellite system (GNSS). The GNSS may include at least one of, e.g., global positioning system (GPS), global navigation satellite system (Glonass), Beidou navigation satellite system (Beidou) or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, or plain old telephone service (POTS). The network 162 may include at least one of telecommunication networks, e.g., a computer network (e.g., LAN or WAN), Internet, or a telephone network.

The first and second electronic devices 102 and 104 each may be a device of the same or a different type from the electronic device 101. The server 106 may include a group of one or more servers. All or some of operations executed on the electronic device 101 may be executed on another or multiple other electronic devices (e.g., the electronic devices 102 and 104 or server 106). When the electronic device 101 performs some functions or services automatically or at a request, the electronic device 101, instead of executing the function or service on its own or additionally, may request the electronic devices 102 and 104 or server 106 to perform at least some functions associated therewith. The electronic devices 102 and 104 or server 106 may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Figure 2:
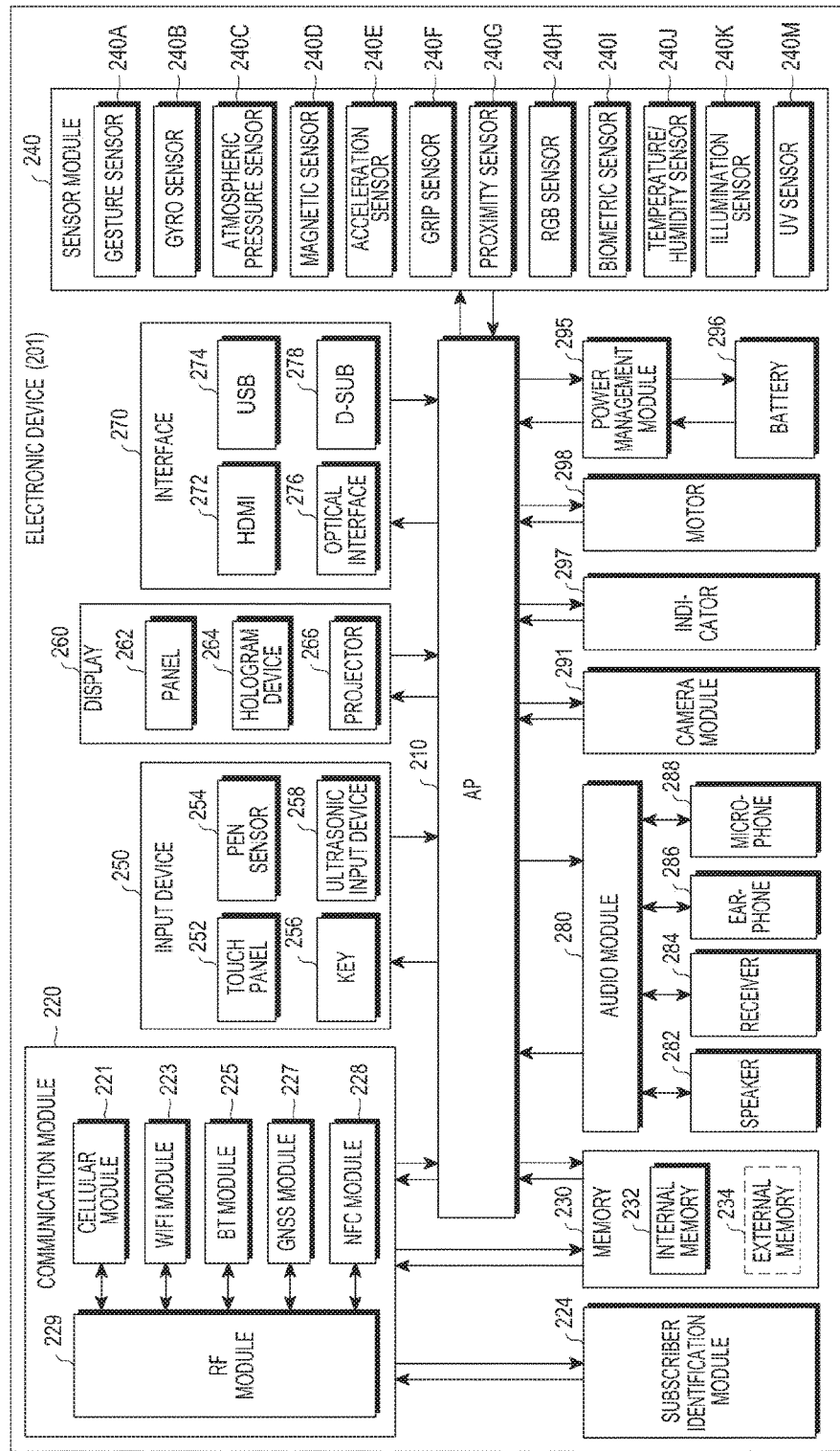
FIG. 2 is a diagram illustrating an electronic device, according to an embodiment of the present disclosure.

FIG. 2 is a diagram illustrating an electronic device 201 according to an embodiment of the present disclosure. The electronic device 201 may include the whole or part of the configuration of the electronic device 101 shown in FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control multiple hardware and software components connected to the processor 210 by running, e.g., an operating system or application programs, and the processor 210 may process and compute various data. The processor 210 may be implemented in, e.g., a system on chip (SoC). The processor 210 may further include a graphic processing unit (GPU) and/or an image signal processor. The processor 210 may include at least some (e.g., the cellular module 221) of the components shown in FIG. 2. The processor 210 may load a command or data received from at least one of other components (e.g., a non-volatile memory) on a volatile memory, process the command or data, and store various data in the non-volatile memory.

The communication module 220 may have the same or similar configuration to the communication interface 170 of FIG. 1. The communication module 220 may include, e.g., a cellular module 221, a Wi-Fi module 223, a Bluetooth module 225, a GNSS module 227 (e.g., a GPS module, a Glonass module, a Beidou module, or a Galileo module), an NFC module 228, and a radio frequency (RF) module 229.

The cellular module 221 may provide voice call, video call, text, or Internet services through, e.g., a communication network. The cellular module 221 may perform identification or authentication on the electronic device 201 in the communication network using the SIM 224. The cellular module 221 may perform at least some of the functions providable by the processor 210. The cellular module 221 may include a communication processor (CP).

The Wi-Fi module 223, the Bluetooth module 225, the GNSS module 227, or the NFC module 228 may include a process for, e.g., processing data communicated through the module. At least some (e.g., two or more) of the cellular module 221, the Wi-Fi module 223, the Bluetooth module 225, the GNSS module 227, or the NFC module 228 may be included in a single integrated circuit (IC) or an IC package.

The RF module 229 may communicate data, e.g., communication signals (e.g., RF signals). The RF module 229 may include, e.g., a transceiver, a power amplifier module (PAM), a frequency filter, a low noise amplifier (LNA), or an antenna. At least one of the cellular module 221, the Wi-Fi module 223, the Bluetooth module 225, the GNSS module 227, or the NFC module 228 may communicate RF signals through a separate RF module.

The SIM 224 may include a card having an embedded SIM, and may contain unique identification information (e.g., an integrated circuit card identifier (ICCID) or subscriber information (e.g., an international mobile subscriber identity (IMSI)).

The memory 230 may include, e.g., an internal memory 232 or an external memory 234. The internal memory 232 may include at least one of, e.g., a volatile memory (e.g., a dynamic read access memory (DRAM), a static RAM (SRAM), a synchronous dynamic RAM (SDRAM), etc.) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD).

The external memory 234 may include a flash drive, e.g., a compact flash (CF) memory, a secure digital (SD) memory, a micro-SD memory, a min-SD memory, an extreme digital (xD) memory, a multi-media card (MMC), or a memory stick. The external memory 234 may be functionally and/or physically connected with the electronic device 201 via various interfaces.

The sensor module 240 may measure a physical quantity or detect a motion state of the electronic device 201, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red-green-blue (RGB)) sensor, a bio sensor 240I, a temperature/humidity sensor 240J, an illumination sensor 240K, or an ultra violet (UV) sensor 240M. Additionally or alternatively, the sensing module 240 may include, e.g., an E-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. The electronic device 201 may further include a processor that is configured to control the sensor module 240 as part of the processor 210 or separately from the processor 210, and the electronic device 2701 may control the sensor module 240 while the processor 210 is in a sleep mode.

The input unit 250 may include, e.g., a touch panel 252, a (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction.

The (digital) pen sensor 254 may include, e.g., a part of a touch panel or a separate sheet for recognition. The key 256 may include e.g., a physical button, optical key or key pad. The ultrasonic input device 258 may sense an ultrasonic wave generated from an input tool through a microphone 288 to identify data corresponding to the sensed ultrasonic wave.

The display 260 may include a panel 262, a hologram device 264, or a projector 266. The panel 262 may have the same or similar configuration to the display 160 of FIG. 1. The panel 262 may be implemented to be flexible, transparent, or wearable. The panel 262 may also be incorporated with the touch panel 252 in a module. The hologram device 264 may make three dimensional (3D) images (holograms) in the air by using light interference. The projector 266 may display an image by projecting light onto a screen. The screen may be, for example, located inside or outside of the electronic device 201. The display 260 may further include a control circuit to control the panel 262, the hologram device 264, or the projector 266.

The interface 270 may include e.g., a high definition multimedia interface (HDMI) 272, a USB 274, an optical interface 276, or a D-subminiature (D-sub) 278. The interface 270 may be included in e.g., the communication interface 170 shown in FIG. 1. Additionally or alternatively, the interface 270 may include a mobile high-definition link (MHL) interface, a secure digital (SD) card/multimedia card (MMC) interface, or IrDA standard interface.

The audio module 280 may convert a sound into an electric signal or vice versa, for example. At least a part of the audio module 280 may be included in e.g., the input/output interface 145 as shown in FIG. 1. The audio module 280 may process sound information input or output through e.g., a speaker 282, a receiver 284, an earphone 286, or the microphone 288.

The camera module 291 may be a device for capturing still images and videos, and may include one or more image sensors (e.g., front and back sensors), a lens, an image signal processor (ISP), or a flash such as an LED or xenon lamp.

The power manager module 295 may manage power of the electronic device 201. Although not shown, the power manager module 295 may include a power management Integrated circuit (PMIC), a charger IC, or a battery gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device 201, including e.g., a booting state, a message state, or recharging state. The motor 298 may convert an electric signal to a mechanical vibration and may generate a vibrational or haptic effect. A processing unit for supporting mobile TV, such as a GPU may be included in the electronic device 201. The processing unit for supporting mobile TV may process media data conforming to a standard for digital multimedia broadcasting (DMB), digital video broadcasting (DVB), or mediaFlo™.

Each of the aforementioned components of the electronic device 201 may include one or more parts, and a name of the part may vary with a type of the electronic device. The electronic device 201 may include at least one of the aforementioned components, omit some of them, or include other additional component(s). Some of the components may be combined into an entity, but the entity may perform the same functions as the components may do.

Figure 3:
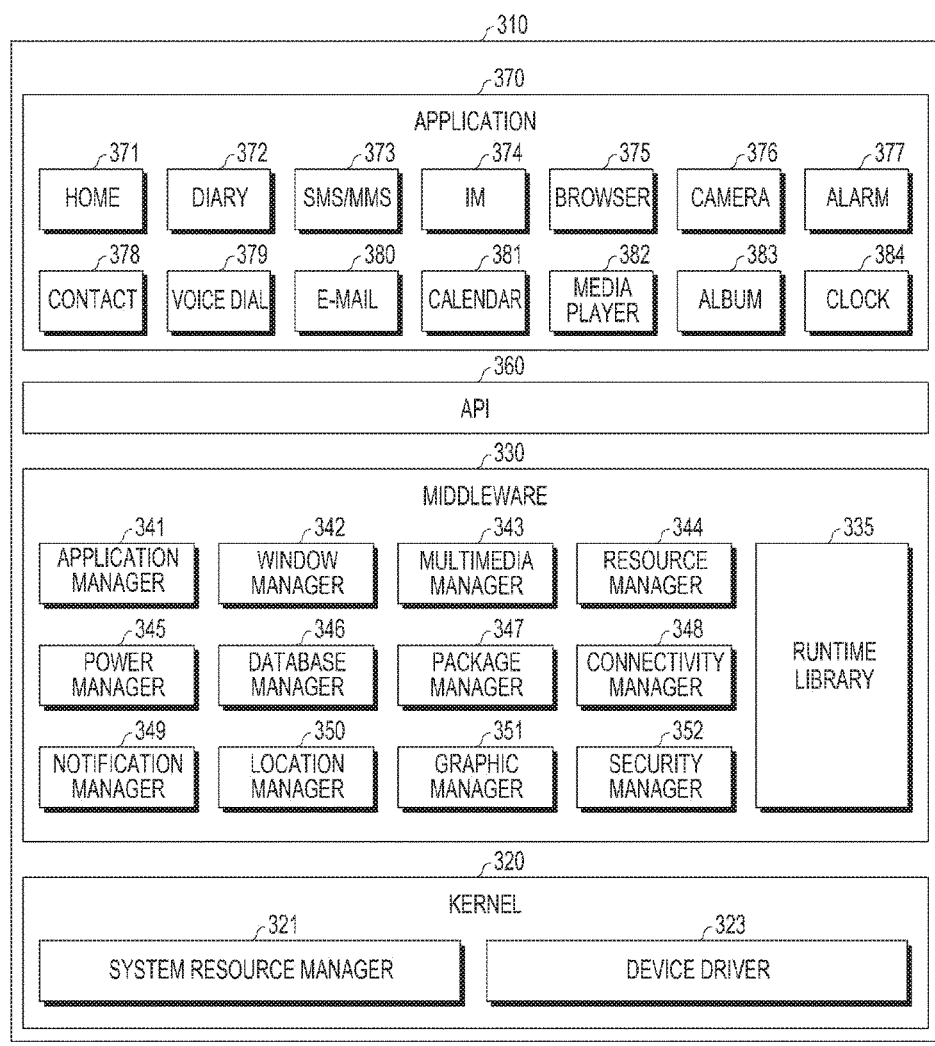
FIG. 3 is a diagram illustrating a program module, according to an embodiment of the present disclosure.

FIG. 3 is a diagram illustrating a program module, according to an embodiment of the present disclosure. The program module 310 may include an OS controlling resources related to the electronic device (e.g., the electronic device 101 or the electronic device 201) and/or various applications (e.g., the application processor 147) driven on the operating system. The operating system may include, e.g., Android™, iOS™, Windows™, Symbian™, Tizen™, or Bada™.

The program 310 may include, e.g., a kernel 320, middleware 330, an application programming interface (API) 360, and/or an application 370. At least a part of the program module 310 may be preloaded on the electronic device or may be downloaded from an external electronic device (e.g., the electronic devices 102 and 104 or server 106).

The kernel 320 may include, e.g., a system resource manager 321 and/or a device driver 323. The system resource manager 321 may perform control, allocation, or recovery of system resources. The system resource manager 321 may include a process managing unit, a memory managing unit, or a file system managing unit. The device driver 323 may include, e.g., a display driver, a camera driver, a Bluetooth driver, a shared memory driver, a USB driver, a keypad driver, a Wi-Fi driver, an audio driver, or an inter-process communication (IPC) driver.

The middleware 330 may provide various functions to the application 370 through the API 360 so that the application 370 may efficiently use limited system resources in the electronic device or provide functions jointly required by applications 370. The middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while, e.g., the application 370 is being executed. The runtime library 335 may perform input/output management, memory management, or operation on arithmetic functions.

The application manager 341 may manage the life cycle of at least one application of, e.g., the applications 370. The window manager 342 may manage GUI resources used on the screen. The multimedia manager 343 may grasp formats necessary to play various media files and use a codec appropriate for a format to perform encoding or decoding on media files. The resource manager 344 may manage resources, such as source code of at least one of the applications 370, memory or storage space.

The power manager 345 may operate together with, e.g., a basic input/output system (BIOS) to manage battery or power and provide power information necessary for operating the electronic device. The database manager 346 may generate, search, or vary a database to be used in at least one of the applications 370. The package manager 347 may manage installation or update of an application that is distributed in the form of a package file.

The connectivity manager 348 may manage wireless connectivity, such as, e.g., Wi-Fi or Bluetooth. The notification manager 349 may display or notify an event, such as a coming message, appointment, or proximity notification, of the user without interfering with the user. The location manager 350 may manage locational information on the electronic device. The graphic manager 351 may manage graphic effects to be offered to the user and their related user interface. The security manager 352 may provide various security functions necessary for system security or user authentication. When the electronic device has telephony capability, the middleware 330 may further include a telephony manager for managing voice call or video call functions of the electronic device.

The middleware 330 may include a middleware module forming a combination of various functions of the above-described components. The middleware 330 may provide a specified module per type of the operating system in order to provide a differentiated function. Further, the middleware 330 may dynamically omit some existing components or add new components.

The API 360 may be a set of, e.g., API programming functions and may have different configurations depending on operating systems. For example, in the case of Android™ or iOS™, one API set may be provided per platform, and in the case of Tizen™, two or more API sets may be offered per platform.

The application 370 may include one or more applications that may provide functions such as, e.g., a home 371, a dialer 372, a short message service (SMS)/multimedia messaging service (MMS) 373, an instant message (IM) 374, a browser 375, a camera 376, an alarm 377, a contact 378, a voice dial 379, an email 380, a calendar 381, a media player 382, an album 383, or a clock 384, a health-care (e.g., measuring the degree of a workout or blood sugar), or provision of environmental information (e.g., provision of air pressure, moisture, or temperature information).

The application 370 may include an information exchanging application supporting information exchange between the electronic device and an external electronic device. Examples of the information exchange application may include, but is not limited to, a notification relay application for transferring specific information to the external electronic device, or a device management application for managing the external electronic device.

For example, the notification relay application may include a function for relaying notification information generated from other applications of the electronic device (e.g., the SMS/MMS application, email application, health-care application, or environmental information application) to the external electronic device. Further, the notification relay application may receive notification information from the external electronic device and may provide the received notification information to the user.

The device management application may perform at least some functions of the external electronic device communicating with the electronic device (for example, turning on/off the external electronic device (or some components of the external electronic device) or control of brightness (or resolution) of the display), and the device management application may manage (e.g., install, delete, or update) an application operating in the external electronic device or a service (e.g., call service or message service) provided from the external electronic device.

The application 370 may include an application (e.g., a health-care application of a mobile medical device) designated according to an attribute of the external electronic device. The application 370 may include an application received from the external electronic device. The application 370 may include a preloaded application or a third party application downloadable from a server. The names of the components of the program module 310 may be varied depending on the type of operating system.

At least a part of the program module 310 may be implemented in software, firmware, hardware, or in a combination of two or more thereof. At least a part of the programming module 310 may be implemented (e.g., executed) by e.g., a processor (e.g., the processor 210). At least a part of the program module 310 may include e.g., a module, program, routine, set of instructions, process, or the like for performing one or more functions.

Figure 4:
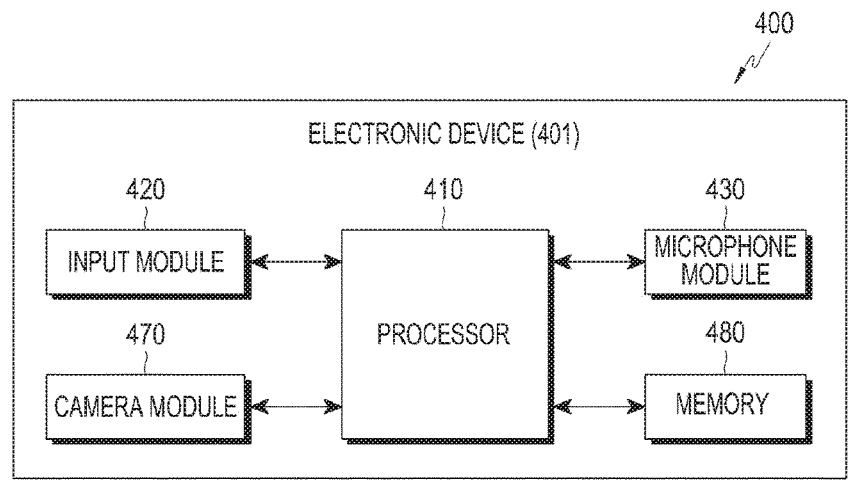
FIG. 4 is a diagram illustrating an electronic device, according to an embodiment of the present disclosure.

FIG. 4 is a diagram illustrating an electronic device, according to an embodiment of the present disclosure. The electronic device 401 may be substantially the same as the electronic device 101 shown in FIG. 1. The electronic device 410 includes a processor 410, an input module 420, a microphone module 430, a camera module 470, and a memory 480.

The input module 420 may be configured similarly to the input device 250 shown in FIG. 2. The input module 420 may receive a user's manipulation for running a particular operation mode of the electronic device 401; the particular operation mode may be, e.g., a camcorder mode for taking a video.

The microphone module 430 may include a plurality of microphones and may receive a sound from a particular direction. The sound may include a voice. The plurality of microphones may include stereo microphones. The plurality of microphones may be arranged at predetermined positions of a housing of the electronic device 401. The plurality of microphones may include at least three microphones. Some of the at least three microphones may include at least one of a speaker and/or a receiver.

The microphone module 430 may be a microphone module included in the electronic device 102. For example, the electronic device 401 may receive a sound obtained by the microphone module included in the external device through the communication interface 170.

The speaker and the receiver each may include a vibration plate and a voice coil and may perform a speaker function for outputting a sound or a microphone function (sound receiving function) for receiving a sound.

The camera module 470 may be configured similarly to the camera module 291 shown in FIG. 2. The camera module 470 may include at least one camera. For example, the camera module 470 may include a first camera and a second camera. The first camera may be a rear camera disposed at a predetermined position on a rear surface of the electronic device 401, and the second camera may be a front camera disposed at a predetermined position on a front surface of the electronic device 401. The first camera may take a video, and when the first camera takes a video, the second camera may obtain an image in the direction of the user (the person taking the image or video).

The memory 480 may be configured similarly to the memory 130 shown in FIG. 1. For example, the memory 480 may store sounds received from at least one microphone of the microphone module 430. Further, the memory 480 may store at least one of information corresponding to an image captured through the camera module 470, information corresponding to a sound obtained by the microphone module 430, or visual information related to the sound.

The processor 410 may be configured similarly to the processor 120 shown in FIG. 1.

The processor 410 may capture at least one image corresponding to an object using the camera module 470. The image may be of various types, e.g., including a motion picture, video, or a sound-containing image (e.g., "sound & shot").

The processor 410 may obtain a sound using the microphone module 430 that is operably connected to the processor 410 while the image is being captured.

The processor 410 may determine whether the sound is related to the object.

For example, the processor 410 may determine whether the sound is related to the object by comparing information corresponding to a pre-stored sound (e.g., sound information). The sound information may include various types of information, such as, a direction of the sound, a distance between the electronic device 401 and the sound, and/or pattern of the sound (e.g., noise, music, etc.). When the sound corresponds to the pre-stored sound information, the sound may be determined to be related to the object.

For example, the processor 410 may determine whether the sound is related to the object by determining the direction of the sound. When it is determined that the sound comes from a direction opposite of the rear surface of the camera module 470, the processor 410 may determine that the sound is related to the object. By contrast, when it is determined that the sound comes from the rear surface of the camera module 470, the processor 410 may determine that the sound is unrelated to the object.

The determination of the direction corresponding to the sound may be performed by the processor 410, e.g., using a direction of arrival (DOA) estimation scheme.

The DOA estimation scheme refers to a technique for detecting the direction in which a waveform arrives from one point using a plurality of microphones.

In the method of determining the direction corresponding to the received sound using the DOA estimation scheme, upon reception of a voice from a particular direction, the electronic device 401 may determine the direction of reception of the voice based on information on the difference between the times when the received voice is received by the microphones of the microphone module 430. For example, the electronic device 401 may compare a first reception time when a sound from a particular direction is received by a speaker and a second reception time when the sound is received by a first microphone of the microphone module 430 and may determine the direction of reception of sound based on the difference between the first reception time and the second reception time. The memory 480 of the electronic device 401 may store data regarding the correlation between a pre-measured (or determined) reception time difference value and a reception direction, and the electronic device 401 may search the correlation data stored in the memory 480 for a particular direction (e.g., 90 degrees) corresponding to the reception time difference among all directions (e.g., a direction from 0 degrees to 360 degrees) based on the determined reception time difference (e.g., 0 seconds) between the first reception time and the second reception time.

For example, the electronic device 401 may further include at least one sensor for obtaining a distance from the object corresponding to the sound, and the processor 410 may determine whether the sound is related to the object based on the distance between the electronic device 401 and the object. The at least one sensor may include various sensors, e.g., the second camera included in the camera module 470, a proximity sensor (e.g., the proximity sensor 240G) for detecting a position from where the object approaches, or an ultrasonic sensor for detecting a distance from the object or motion of the object by using the characteristics of ultrasonic wave or generating ultrasonic waves.

For example, the electronic device 401 may further include a camera module other than the camera module 470, and the processor 410 may determine whether the sound is related to the object by analyzing an image captured through the other camera module. The processor 410 may determine whether at least one image obtained through the other camera module includes a face through a face recognition technique, and when the at least one image obtained through the other camera module includes the face, the processor 410 may recognize a mouth portion of the face, and the processor 410 may determine whether the sound is related to the object based on whether the mouth portion moves. For example, when the mouth portion moves, the processor 410 may determine that the sound is related to the object. By contrast, unless the mouth portion moves, the processor 410 may determine that the sound is unrelated to the object, i.e., the sound comes from a user of the electronic device 401.

For example, the processor 410 may make comparison as to whether a pre-stored sound (e.g., a voice of a certain person) corresponds to the obtained sound, and when the pre-stored sound corresponds to the obtained sound, the processor 410 may determine that the obtained sound is related to the object.

For example, the processor 410 may make comparison as to whether a pre-stored sound pattern (e.g., noise or music) corresponds (e.g., conforms to) a pattern of the obtained sound, and when the pre-stored sound pattern corresponds to the pattern of the obtained sound, the processor 410 may determine that the obtained sound is unrelated to the object.

When it is determined that the sound is unrelated to the object, the processor 410 may adjust some of the settings of the electronic device 401 to vary at least one of the attributes of the sound and store the same in relation to the at least one image.

For example, the variation of at least one attribute of the sound may include, but is not limited to, e.g., varying a strength of the sound (e.g., volume-up, volume-down, or mute).

The processor 410 may enable visual information to be stored in relation to the sound. Upon determining that the sound is unrelated to the object, or that the strength of the sound is low when playing the captured image, the processor 410 may vary the strength of the sound and output the varied sound and/or display the stored visual information. The sound determined to be unrelated to the object may be, e.g., a voice of the user of the electronic device 401 or a sound from another user or device (e.g., a TV or radio) positioned around the electronic device 401. The visual information may be determined dynamically and displayed by the processor 410 at the time when the at least one image is not being captured, but at the time when the image is played.

When it is determined that the sound is related to the object, the processor 410 may prevent the attributes of the sound (e.g., the strength of the sound) from being varied.

The processor 410 may capture a video using the first camera of the camera module 470, and the processor 410 may determine whether a sound is received coming from a first direction of the electronic device 401 while capturing the video.

For example, the first direction may be a direction where the user, while capturing the video using the electronic device 401, is positioned. Further, the first direction may be a direction where the user, while capturing the video holding the electronic device 401, is positioned. Further, the first direction may be a direction corresponding to the second camera of the camera module 470, e.g., a direction where the object of the image obtained by the second camera is positioned.

For example, the processor 410 may receive a sound through a plurality of microphones included in the microphone module 430 (e.g., the speaker or receiver activated to perform a sound receiving function, the first microphone, and the second microphone). Further, the processor 410 may determine a direction corresponding to the received sound to determine whether the determined direction is the first direction. For example, when it is determined that the direction of the received sound is coming from the direction of the user, the processor 410 may determine that the determined direction is the first direction.

In order to determine whether the determined direction is the first direction, the processor 410 may activate the second camera of the camera module 470. For example, while running the video capturing, the processor 410 may activate the second camera. Further, the processor 410 may recognize the mouth portion from the face of the image obtained through the second camera, determine whether the recognized mouth portion moves, and determine whether the determined direction is the first direction. For example, when it is determined that the recognized mouth portion moves, the processor 410 may determine that the determined direction is the first direction. For example, the processor 410 may determine a direction corresponding to the received sound using a DOA estimation scheme.

When receiving a sound from the first direction of the electronic device 401, the processor 410 may control the strength of the received sound through a plurality of microphones included in the microphone module 430 from the first direction and store the same in the memory 480.

For example, when receiving a sound from the first direction, the processor 410 may vary the strength of the received sound to a strength corresponding to the first direction, and the processor 410 may reduce the strength of the received sound to a predetermined strength.

The processor 410 may determine a sound reception range corresponding to the first direction using a beamforming technique and may vary the strength of the received sound in the determined sound reception range to a strength corresponding to the first direction. The beamforming technique refers to a technique for determining a sound reception range using a plurality of microphones for the purpose of receiving a sound from the electronic device 401 in a particular direction.

For example, the processor 410 may compensate for the difference in the reception time of the received sound between the plurality of microphones in the microphone module 430. Further, the processor 410 may synthesize the respective reception time difference-compensated sounds for the plurality of microphones in the microphone module 430 and store the same in the memory 480.

The compensation for the reception time difference may be performed as to allow a difference in the reception times of the sound between the plurality of microphones in the microphone module 430 to correspond to the reception time in the direction (e.g., the first direction) of the received sound. Further, the compensation for the reception time difference may be performed using various delay compensation techniques.

The sound received through the plurality of microphones may be assigned to a first sound channel designated from among multiple sound channels.

For example, the operation of storing in the memory 480 may be performed using the multiple channels. The multiple channels may include a first sound channel and a second sound channel. A sound corresponding to the first direction may be assigned to the first channel, and a sound corresponding to the second direction may be assigned to the second channel. The sound corresponding to the first direction may be a sound from the direction of the user (e.g., the user's voice), and the sound corresponding to the second direction may be a sound from the direction of the object (e.g., a voice of the object to be captured).

The processor 410 may activate at least one microphone function, e.g., a speaker function or a receiver function.

For example, the processor 410 may activate the speaker or the receiver upon running a first operation of the electronic device 401, according to a user's manipulation through the input module 420.

The first operation may be an image capturing operation. Further, the first operation may be an operation for recognizing a person's talk while the image capturing operation runs. The operation for recognizing the person's talk may be performed using various voice recognition techniques.

For example, the processor 410 may include a speaker driving signal processing unit and a receiver driving signal processing unit for converting a digital signal into an analog signal, a first microphone input signal processing unit and a second microphone input signal processing unit for converting an analog signal into a digital signal. The processor 410 may activate the speaker to function as the microphone by connecting an end of the speaker connected with the speaker driving signal processing unit to the first microphone input signal processing unit instead of the speaker driving signal processing unit. Further, the processor 410 may activate the receiver to function as the microphone by connecting an end of the receiver connected with the receiver driving signal processing unit to the second microphone input signal processing unit instead of the receiver driving signal processing unit.

Various other techniques than the foregoing may apply to enable the speaker and receiver functions of the microphone.

Figure 5:
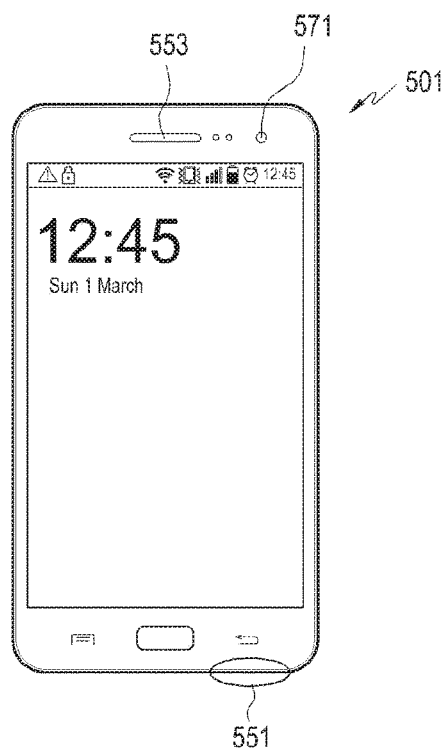
FIG. 5 is a diagram illustrating an electronic device, according to an embodiment of the present disclosure.

FIG. 5 is a diagram illustrating an electronic device, according to an embodiment of the present disclosure. Referring to FIG. 5, a speaker 551 may be positioned at a side of a lower portion on a front surface of the electronic device 501 (which can be configured similarly to the electronic device 401). A receiver 553 may be positioned at the middle of an upper portion on the front surface of the electronic device 501.

The speaker 551 and/or the receiver 553 may output sounds and may be used when the electronic device 501 plays or makes calls or plays music. However, the speaker 551 and/or the receiver 553 may also be used as a microphone for sound receiving by varying a bias (varying a control signal, or varying current or voltage). For example, upon video capturing using the first camera 571 (which can be configured similarly to the first camera included in the camera module 470) of the electronic device 501, the receiver 553 may recognize a sound of the user. As such, when receiving a sound through the speaker 551 and/or the receiver 553, the speaker 551 and/or the receiver 553 may contribute to the sound recognition, leading to an additional enhancement in the multi-microphone processor of the electronic device 501.

Figure 6:
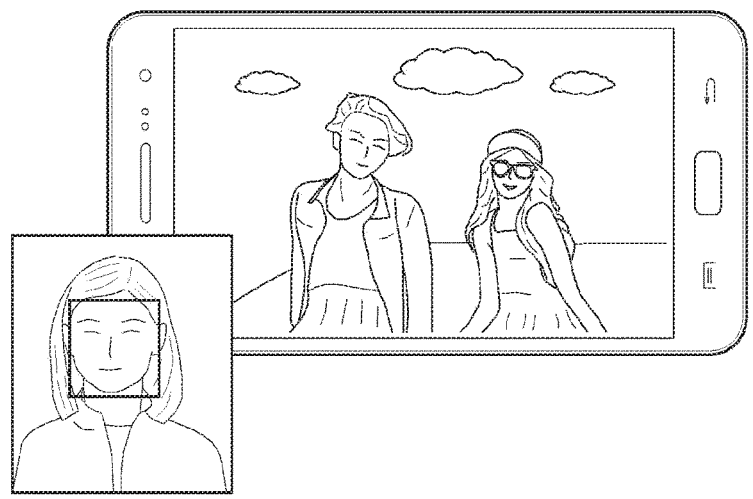
FIG. 6 is a diagram illustrating an electronic device that utilizes a front camera for video capturing, according to an embodiment of the present disclosure.

FIG. 6 is a diagram illustrating an electronic device (e.g., the electronic device 401) that utilizes a front camera for video capturing, according to an embodiment of the present disclosure. Most electronic devices include a front camera and a rear camera. However, upon image capturing (e.g., taking a video) using the rear camera, the front camera may be activated to capture an image of the user, and the mouth portion of the user may be determined as to whether it moves through a face recognition technique, thereby enhancing the accuracy of the sound recognition operation in the direction of the user. For example, the user may take a video using the rear camera of the electronic device, and the captured image may be displayed on the screen corresponding to the rear camera of the electronic device. Further, e.g., upon playing the captured video, the electronic device may activate the front camera to obtain an image of the user and may use a face recognition technique to monitor whether the mouth portion of the user's face moves. Upon identifying the motion of the mouth portion of the user, the user may be determined to be talking, and upon sound recognition of the electronic device, the accuracy of sound recognition in the direction of the user may be enhanced. Meanwhile, no image in the direction of the user may be displayed on the screen.

Figure 7:
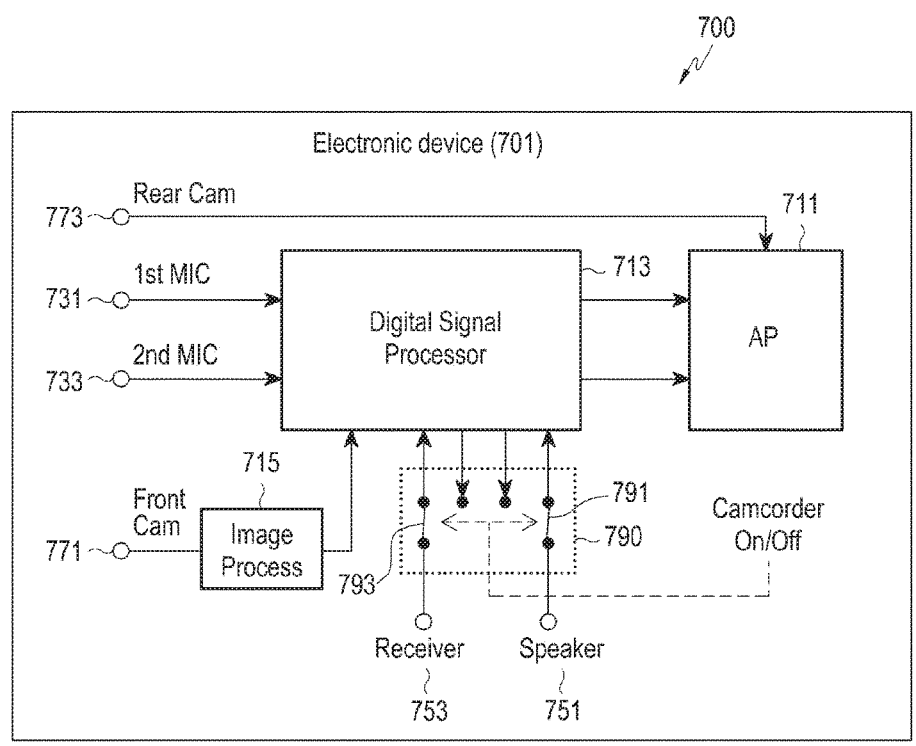
FIG. 7 is a diagram illustrating a circuit of an electronic device, according to an embodiment of the present disclosure.

FIG. 7 is a diagram illustrating a circuit 700 of an electronic device 701, according to an embodiment of the present disclosure. The electronic device 701 may be configured similarly to the electronic device 401 shown in FIG. 4. The electronic device 701 may include an application processor (AP) 711, a digital signal processor 713, an image processor 715, a first microphone 731, a second microphone 733, a speaker 751, a receiver 753, a first camera 773 (e.g., a rear camera), and a second camera 771 (e.g., a front camera). The electronic device 701 may further include a switch module 790.

The first microphone 731 and the second microphone 733 may be configured similarly to the microphones included in the microphone module 430 shown in FIG. 4.

The digital signal processor 713 may be configured similarly to the processor 410 of FIG. 4. The digital signal processor 713 may perform audio processing on an input signal. For example, the digital signal processor 713 may bi-laterally perform conversion between sound and electrical signals. The digital signal processor 713 may convert an analog sound signal received through the first microphone 731 into a digital sound signal and transmit the digital sound signal to the AP 711. The digital signal processor 713 may convert an analog sound signal received through the second microphone 733 into a digital sound signal and transmit the digital sound signal to the AP 711.

Figure 8A:
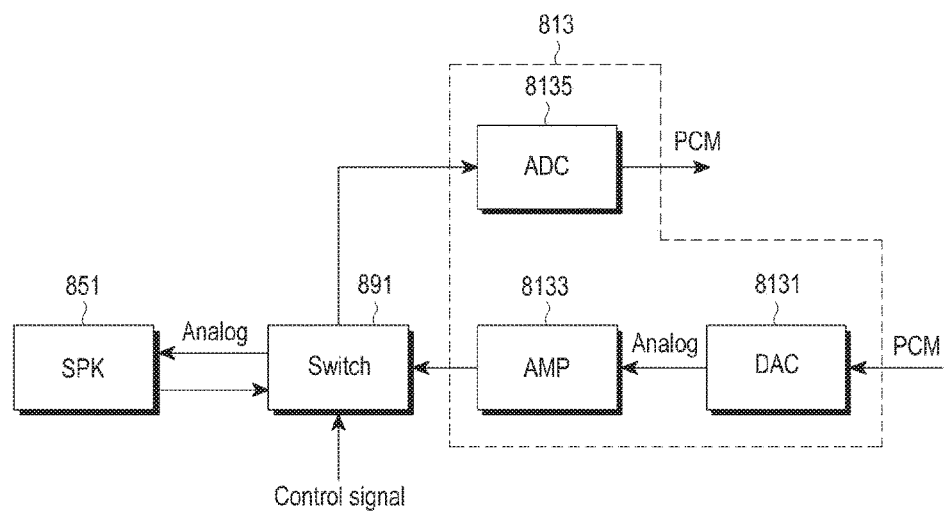
FIG. 8A is a diagram illustrating a circuit of a microphone-compatible speaker, according to an embodiment of the present disclosure.

The digital signal processor 713 may be configured similarly to the digital signal processor 813 of FIG. 8A.

Referring to FIG. 8A, the digital signal processor 813 may include a digital-analog converter (DAC) 8131 for converting digital signals into analog signals, an amplifier (AMP) 8133 for amplifying input signals, and an analog-digital converter (ADC) 8135 for converting analog signals into digital signals.

The digital signal processor 813 may be connected to a switch 891 (which can be configured similarly to the first switch 791) that is connected to a speaker 891 (which can be configured similarly to the speaker 751), and the switch 891 may perform a switching operation according to a control signal received from the digital signal processor 813. As the switch 891 switches, the speaker 851 may function as a speaker or microphone. For example, the switch 891 may perform switching to connect the speaker 851 to the amplifier 8133 connected with the digital-analog converter 8131 under the control of an AP (e.g., the AP 711) to allow the speaker 851 to function as a speaker. Here, the digital signal processor 813 may convert the received digital sound signal into an analog sound signal and transmit it to the speaker 851. Further, the switch 891 may perform switching to connect the speaker 851 to the analog-digital converter 8135 to allow the speaker 851 to function as a microphone. Here, the digital signal processor 813 may convert the received analog sound signal into a digital sound signal and transmit it to the AP.

Meanwhile, the component including the digital-analog converter 8131 and the amplifier 8133 may be referred to as a speaker driving signal processing unit. The component including the analog-digital converter 8135 may be referred to as a microphone input signal processing unit.

Figure 8B:
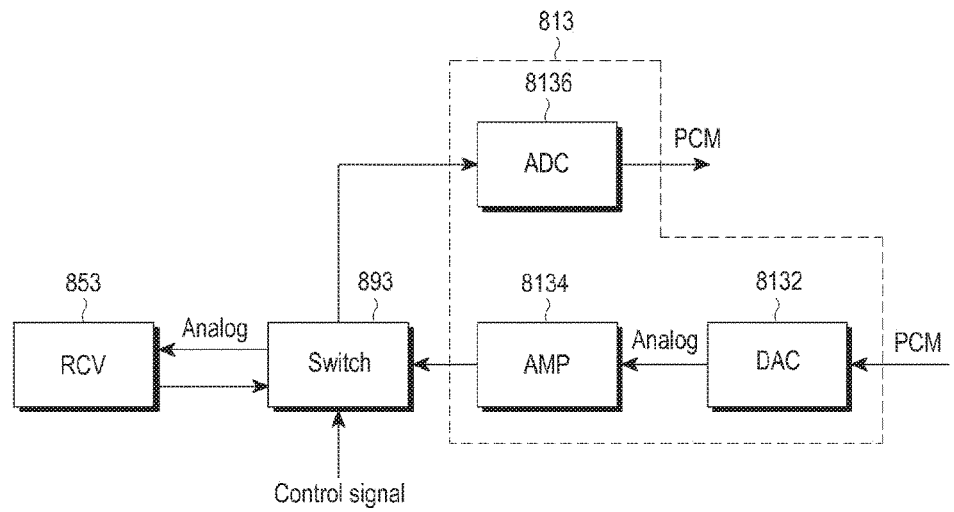
FIG. 8B is a diagram illustrating a circuit of a microphone-compatible receiver, according to an embodiment of the present disclosure.

The digital signal processor 713 may be configured similarly to the digital signal processor 813 of FIG. 8B.

Referring to FIG. 8B, the digital signal processor 813 may include a digital-analog converter 8132, an amplifier 8134, and an analog-digital converter 8136. The digital signal processor 813 may be connected to a switch 893 (which can be configured similarly to, the second switch 793) that is connected to a receiver 853 (which can be configured similarly to the receiver 753), and the switch 893 may perform a switching operation according to a control signal received from the digital signal processor 813. As the switch 893 switches, the receiver 853 may function as a speaker or microphone. For example, the switch 893 may perform switching to connect the receiver 853 to the amplifier 8134 connected with the digital-analog converter 8132 under the control of the AP (e.g., the AP 711) to allow the receiver 853 to function as a speaker. Further, the switch 893 may perform switching to connect the receiver 853 to the analog-digital converter 8136 to allow the receiver 853 to function as a microphone.

With reference again to FIG. 7, the first camera 773 and the second camera 771 may be cameras included in the camera module 470 shown in FIG. 4. The first camera 773 may be the rear camera, and the second camera 771 may be the front camera.

The image processor 715 may be included in the processor 410 of FIG. 4. The image processor 715 may image-process an image obtained through the second camera 771. For example, the image processor 715 may input the image obtained through the second camera 771 in line or frame units, and the image processor 715 may process the unit image to generate a display image and compression-coded image. For example, the image processor 715 may convert an image obtained through the second camera 771 into a digital image and output the digital image.

The image processor 715 may recognize a mouth portion from the face of the image obtained through the second camera 771 using a face recognition technique and may transmit parameters to the digital signal processor 713. The parameters may be information indicating whether the recognized mouth portion moves. Meanwhile, various techniques may be used as the face recognition technique.

The switch module 790 may include the first switch 791 and the second switch 793.

For example, the first switch 791 may perform switching to allow the speaker 751 to function as a speaker or microphone under the control of the digital signal processor 713 (or the AP 711). The second switch 793 may perform switching to allow the receiver 753 to function as a speaker or microphone under the control of the digital signal processor 713 (or the AP 711). Further, the first switch 791 and the second switch 793 may perform switching individually or simultaneously under the control of the digital signal processor 713 (or the AP 711).

Meanwhile, the switch module 790 may be included in the digital signal processor 713.

The AP 711 may be included in the processor 410 of FIG. 4. The AP 711 may control the digital signal processor 713, the image processor 715, the first microphone 731, the second microphone 733, the speaker 751, the receiver 753, the first camera 773, the second camera 771, and the switch module 790.

The AP 711 may run a video capturing operation of the first camera 773. Accordingly, the image signal captured by the first camera 773 and the sound signal, which is input to the speaker 751, the receiver 753, the first microphone 731, and the second microphone 733 and subjected to audio processing (or multi-microphone processing) of the digital signal processor 713, are received, and the video may be encoded.

Additionally, the AP 711 may activate the second camera 771 upon video capturing. Further, the AP 711 may obtain parameters from the image obtained through the second camera 771 through image processing by the image processor 715. The parameters may be information indicating whether the mouth portion of the face obtained by applying a face recognition technique to the image moves. Further, the AP 711 may control the first switch 791 and the second switch 793 to allow the speaker 751 and the receiver 753 to function as a microphone so that a sound signal is input to the audio processing.

Further, the AP 711 may determine a direction (the direction from where the sound signal is received) of the sound signal that has undergone the audio processing in the digital signal processor 713. When the determined direction is the first direction, the AP 711 may vary a strength of the received sound to a strength corresponding to the first direction or assign the received sound to a channel corresponding to the first direction and may record the sound. When the determined direction is the first direction, and the parameter is information indicating the motion of the mouth portion, the AP 711 may vary the strength of the received sound to a strength corresponding to the first direction or assign the received sound to a channel corresponding to the first direction and may record the sound.

Figure 9:
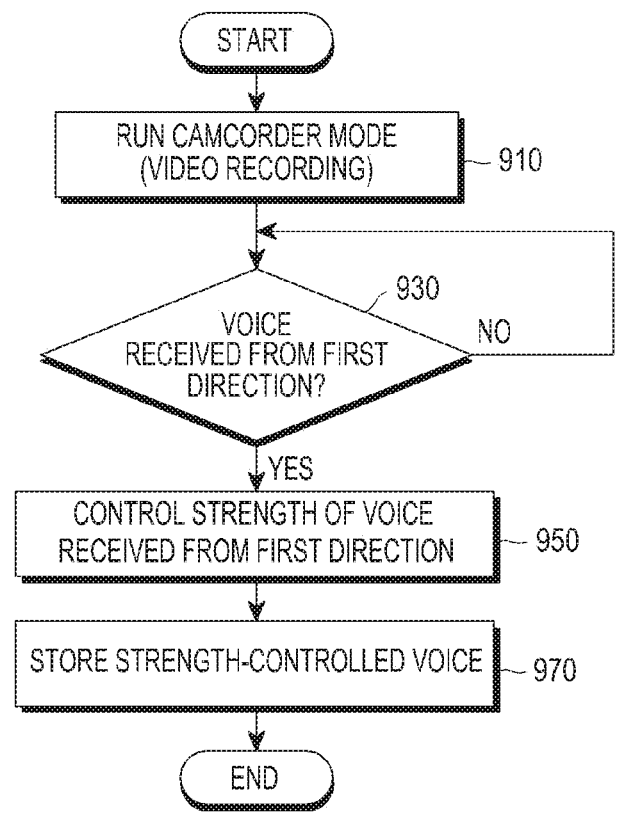
FIG. 9 is a flowchart of a method for a sound processing operation in an electronic device, according to an embodiment of the present disclosure.

FIG. 9 is a flowchart of a method for a sound processing operation an electronic device, according to an embodiment of the present disclosure. Referring to FIG. 9, an example is described in which the sound is a voice, and the image is a video.

In operation 910, the electronic device (e.g., the electronic device 401) may run a camcorder mode (video capturing).

The electronic device may capture a video using a first camera.

In operation 930, the electronic device may determine whether the voice is received from a first direction. When the electronic device determines in operation 930 that the voice is received from the first direction, the electronic device performs operation 950; otherwise, operation 930 is performed again.

While capturing a video using the first camera, the electronic device may determine whether the voice is received from the first direction of the electronic device. For example, the operation of determining whether the voice is received from the first direction of the electronic device may include receiving the voice through a plurality of microphones, determining a direction corresponding to the received voice, and determining whether the determined direction is the first direction. The operation of determining whether the determined direction is the first direction may further include activating the second camera, recognizing a mouth portion from a face of the image obtained through the second camera, determining whether the recognized mouth portion moves, and determining whether the determined direction is the first direction.

Meanwhile, the operation of determining the direction corresponding to the received voice may be performed using a DOA estimation technique.

The operation of determining whether the voice is received from the first direction of the electronic device may include activating the second camera, recognizing the mouth portion from the face of the image obtained through the second camera, determining whether the recognized mouth portion moves, and upon determining that the recognized mouth portion moves, determining that the voice is received from the first direction of the electronic device.

Meanwhile, the plurality of microphones may include at least three microphones, which may include at least one of a speaker or receiver that are each functional as a microphone. For example, when the video capturing is performed, the electronic device may activate the microphone function of the speaker by connecting an end of the speaker that is connected with the speaker driving signal processing unit to the first microphone input signal processing unit instead of the speaker driving signal processing unit. Further, the electronic device may activate the microphone function of the receiver by connecting an end of the receiver connected with the receiver driving signal processing unit to the second microphone input signal processing unit instead of the receiver driving signal processing unit.

Meanwhile, the speaker driving signal processing unit and the receiver driving signal processing unit may be configured to convert a digital signal into an analog signal, and the first microphone input signal processing unit and the second microphone input signal processing unit may be configured to convert an analog signal into a digital signal.

In operation 950, the electronic device may control the strength of the voice received from the first direction.

The operation of controlling the strength of the voice received through the plurality of microphones from the first direction may include determining a sound reception range corresponding to the first direction using a beamforming technique and varying the strength of the received voice in the determined sound reception range to a strength corresponding to the first direction.

In operation 970, the electronic device may store the strength-controlled voice.

The operation of storing the strength-controlled voice may include compensating for a difference in the reception time of the received voice between the plurality of microphones and synthesize the same.

The electronic device may further assign the voice received through the plurality of microphones from the first direction to a first sound channel of multiple sound channels.

Figure 10:
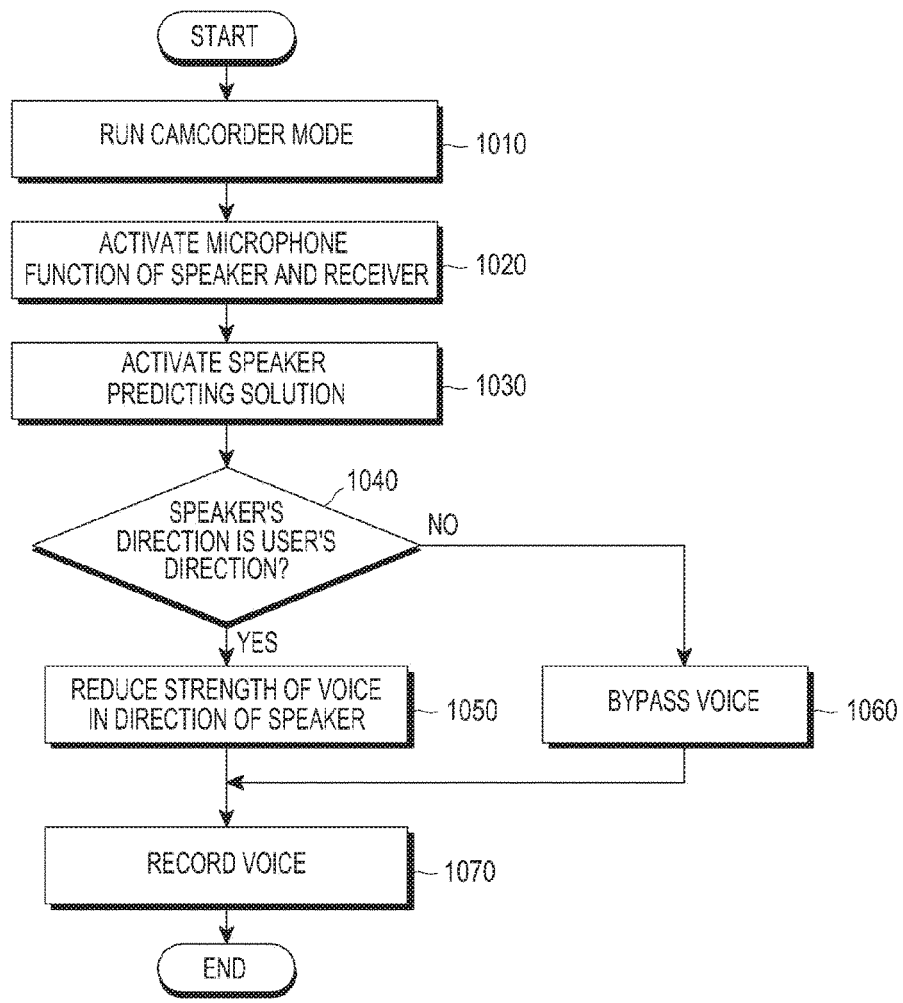
FIG. 10 is a flowchart of a method for a sound processing operation used in an electronic device, upon running a camcorder, according to an embodiment of the present disclosure.

FIG. 10 is a flowchart of a method for a sound processing operation in an electronic device (e.g., the electronic device 401), upon running a camcorder, according to an embodiment of the present disclosure. For example, upon capturing a video using the electronic device, the user may be positioned closer to the electronic device than an object that is to be captured, and thus, the user's sound may be recorded at a higher level than a sound from the object. To address this issue, the direction of the person who speaks may be detected, and when the direction of the speaking person is the direction of the user, the received sound may be reduced to a predetermined strength as per predetermined conditions as shown in FIG. 10. An example is now described in which the sound is a voice, and the image is a video.

In operation 1010, the electronic device may run a camcorder mode for video capturing by the user's manipulation. For example, upon video capturing using the electronic device, the user may take the video using the first camera of the electronic device while holding the electronic device.

In operation 1020, the electronic device may activate the microphone function of the speaker and receiver.

In operation 1030, the electronic device may activate a speaker predicting solution through voice reception to determine the direction from which the voice is received and predict the speaker (speaking person). The speaker predicting solution may include the operation of receiving a voice through at least one microphone of the speaker and receiver whose microphone function is in activation and the operation of determining the direction corresponding to the received voice, e.g., the direction of the received voice.

In operation 1040, the electronic device may determine whether the direction of the speaker is the direction of the user. For example, the electronic device may determine whether the direction of the speaker is the direction of the user by determining in operation 1030 whether the determined direction of reception is the direction of the user. For example, when the determined direction of reception is the direction where the object for which to be video-captured is positioned, the electronic device may determine that the determined direction of the speaker is the direction of the object, and when the determined direction of reception is opposite the direction of the object, the electronic device may determine that the direction of the speaker is the direction of the user. For example, when the first camera is the rear camera positioned on the rear surface of the electronic device, and the determined direction of reception is the front direction of the electronic device, the electronic device may determine that the direction of the speaker is the direction of the user.

When the electronic device determines in operation 1040 that the direction of the speaker is the direction of the user, the electronic device may perform operation 1050; otherwise the electronic device may perform operation 1070.

In operation 1050, the electronic device may reduce the strength of a received voice in the direction of the speaker. For example, the electronic device may reduce the strength of the received voice to a predetermined strength corresponding to the direction of the user.

In operation 1060, the electronic device may perform a bypassing operation on the voice signal. For example, the electronic device may abstain from varying the strength of the received voice.

In operation 1070, the electronic device may record the voice. For example, when the electronic device reduces the strength of the voice in the direction of the speaker, the electronic device may record the strength-reduced voice. Further, for example, when the electronic device bypasses the voice, the electronic device may record the received voice without varying the strength.

Figure 11:
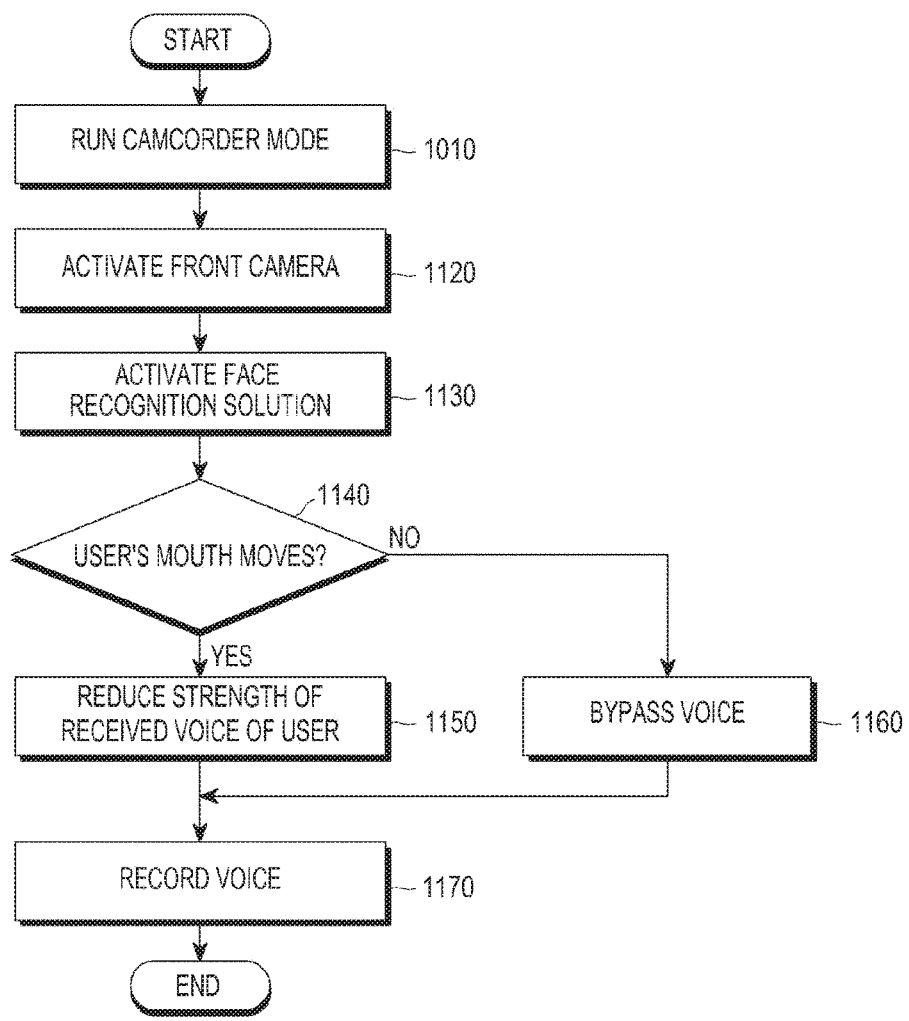
FIG. 11 is a flowchart of a method for a sound processing operation used in an electronic device, upon running a camcorder, according to an embodiment of the present disclosure.

FIG. 11 is a flowchart a method of a sound processing operation in an electronic device, upon running a camcorder, according to an embodiment of the present disclosure. In order to address an issue that the user's sound is recorded at a higher level than the object for which to be captured upon video capturing using the electronic device, when the mouth portion of the user's face obtained through the front camera moves, the strength of the received voice may be reduced as per predetermined conditions as shown in FIG. 11. An example is now described in which the sound is a voice, and the image is a video.

In operation 1110, the electronic device may run a camcorder mode for video capturing by the user's manipulation. For example, the user may take a video using the rear camera of the electronic device.

In operation 1120, the electronic device may activate the front camera to obtain an image of the user.

In operation 1130, the electronic device may activate a face recognition solution. The face recognition solution may include an operation for predicting the speaker. The face recognition solution may further include the operation of recognizing a mouth portion of the person's face in an image obtained through the front camera and the operation of determining whether the recognized mouth portion moves. When determined that the mouth portion moves, it may be determined that the user is speaking.

In operation 1140, the electronic device may determine whether the mouth portion of the user moves. When the electronic device determines in operation 1140 that the user's mouth portion moves, the electronic device may perform operation 1150; otherwise, the electronic device may perform operation 1160.

In operation 1150, the electronic device may reduce the strength of the received voice of the user. For example, the electronic device may reduce the strength of the received voice to a predetermined strength.

In operation 1160, the electronic device may perform a bypassing operation on the voice. For example, the electronic device may abstain from varying the strength of the received voice.

In operation 1170, the electronic device may record the voice. For example, when the electronic device reduces the strength of the received voice, and the electronic device may record the strength-reduced voice. Further, for example, when the electronic device bypasses the voice, the electronic device may record the received voice without varying the strength.

The respective operations of the front camera and the rear camera may be reversely performed.

Figure 12:
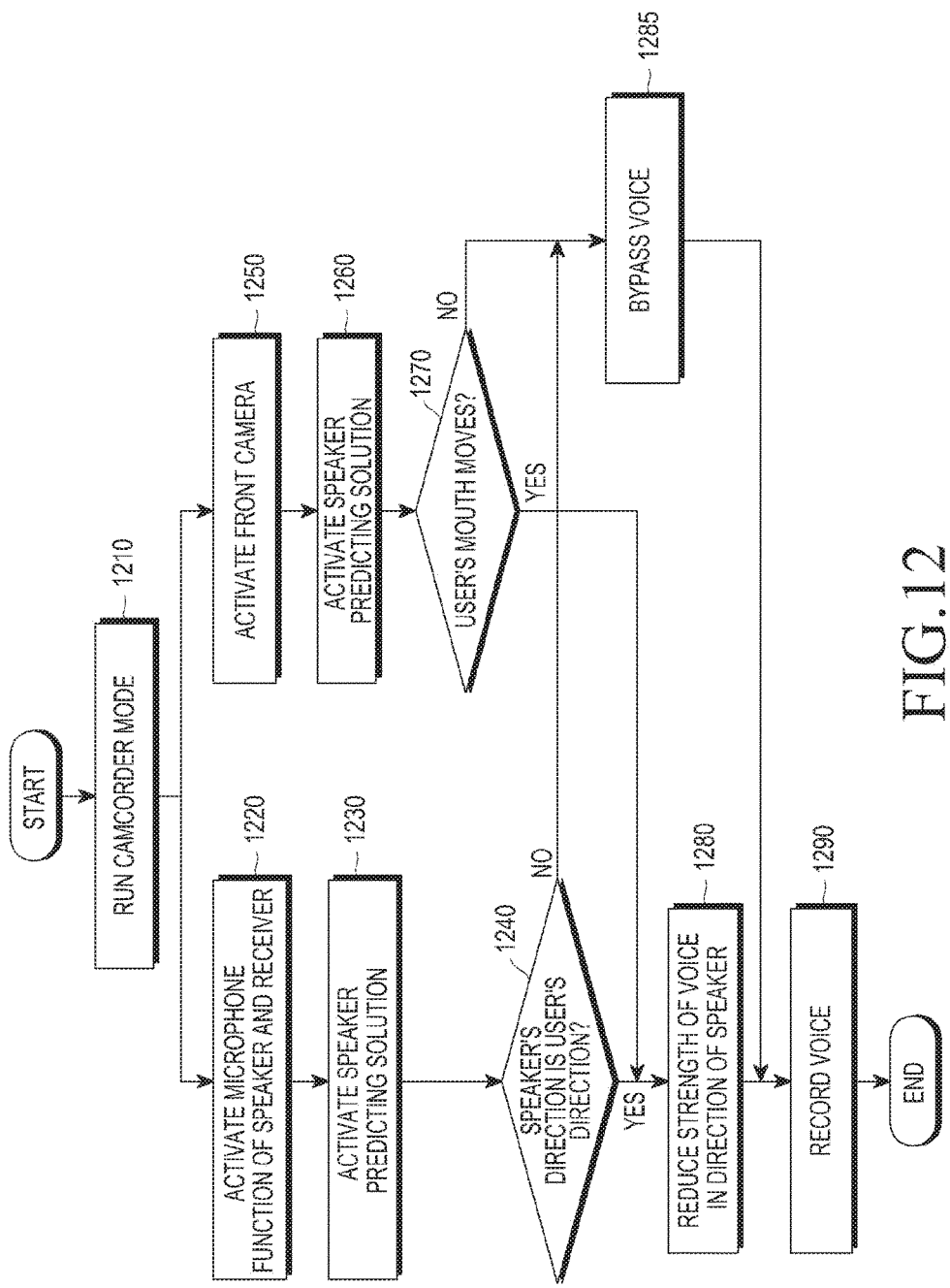
FIG. 12 is a flowchart of a method for a sound processing operation used in an electronic device, upon running a camcorder, according to an embodiment of the present disclosure.
Figure 13:
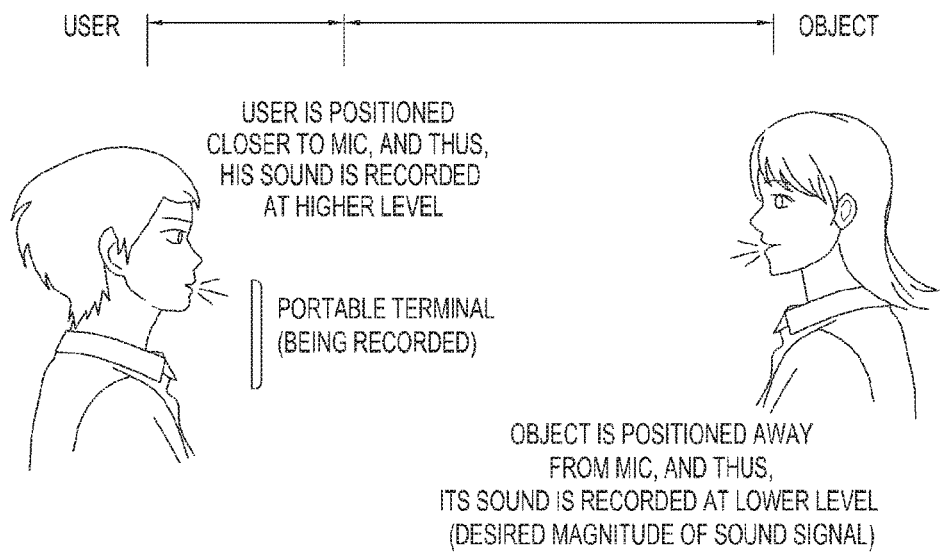
FIG. 13 is a diagram illustrating an example of video capturing using a conventional electronic device.

FIG. 12 is a flowchart of a method for a sound processing operation in an electronic device, upon running a camcorder, according to an embodiment of the present disclosure.

In order to address the issue that the user's voice is recorded at a higher level than the object for which to be captured upon video capturing using the electronic device, when the direction of the speaker is the direction of the user and/or the mouth portion of the user's face obtained through the front camera facing the user moves, the strength of the received voice may be reduced as per predetermined conditions as shown in FIG. 12. Thus, even when either the operation performed when the direction of the speaker is the direction of the user or the operation performed when there is a motion of the mouth portion of the user's face obtained through the front camera facing the user malfunctions or does not operate, the sound processing operation may be performed. Further, the sound processing operation may be performed in a more accurate way. An example is now described in which the sound is a voice, and the image is a video.

In operation 1210, the electronic device) may run a camcorder mode for video capturing by the user's manipulation.

In operation 1220, the electronic device may activate the microphone function of the speaker and receiver.

In operation 1230, the electronic device may activate a speaker predicting solution through voice reception to determine the direction from which the voice is received and predict the speaker.

In operation 1240, the electronic device may determine whether the direction of the speaker is the direction of the user. When the electronic device determines in operation 1240 that the direction of the speaker is the direction of the user, the electronic device may perform operation 1280; otherwise, the electronic device may perform operation 1285.

In operation 1250, the electronic device may activate the front camera.

In operation 1260, the electronic device may activate a face recognition solution.

In operation 1270, the electronic device may determine whether the mouth portion of the user moves. When the electronic device determines in operation 1270 that the user's mouth portion moves, the electronic device may perform operation 1280; otherwise, the electronic device may perform operation 1285.

In operation 1280, the electronic device may reduce the volume of voice in the direction of the speaker.

In operation 1285, the electronic device may perform a bypassing operation on the voice signal.

In operation 1290, the electronic device may capture the voice. For example, when the electronic device reduces the strength of the voice in the direction of the speaker, the electronic device may record the strength-reduced voice. Further, for example, when the electronic device bypasses the voice, the electronic device may record the received voice without varying the strength.

Referring to FIG. 12, upon failure to recognize the motion of the mouth portion of the user's face obtained through the front camera facing the user, when the direction of the speaker is determined to be the direction of the user through detection of the direction of the speaker, the strength of the received voice may be reduced according to predetermined conditions. Further, upon failure to recognize the direction of the speaker, when the mouth portion of the user's face is determined to have moved through motion recognition on the mouth portion of the user's face obtained through the front camera facing the user, the strength of the received voice may be reduced according to predetermined conditions.

Meanwhile, operations 1220, 1230, and 1240 may be performed in parallel (simultaneously) or in series (sequentially) with operations 1250, 1260, and 1270.

Although, in an example where the direction of the speaker (e.g., the first direction) is the direction of the user has been described, the direction of the speaker may be the direction of the object for which to be captured, and when the direction of the speaker is the direction of the object, the operation of increasing the strength of the received voice may be performed by predetermined conditions.

According to an embodiment of the present disclosure, there is a method for processing a sound by an electronic device comprising capturing at least one image corresponding to an object using a camera functionally connected with the electronic device, obtaining a sound using at least one microphone functionally connected with the electronic device at least temporarily when the image is captured, determining whether the sound is related to the object, and when the sound is determined to be unrelated to the object, varying at least some attributes of the sound and storing in association with the at least one image.

The method for processing the sound by the electronic device may further comprise storing visual information in relation to the sound.

Determining whether the sound is related to the object may include determining a direction corresponding to the sound, and when the sound is a sound from a direction of a rear surface of the camera, determining that the sound is unrelated to the object.

Determining the direction corresponding to the sound may include determining the direction corresponding to the sound using a direction of arrival (DOA) estimation technique.

The method may further comprise, when the direction corresponding to the sound is a first direction, assigning the sound to a first sound channel of multiple sound channels, and when the direction corresponding to the sound is a second direction, assigning the sound to a second sound channel of the multiple sound channels.

The microphone may include at least one of a speaker compatible as a microphone or a receiver compatible as a microphone, and the method may further comprise activating at least one microphone function of the speaker or the receiver when the image capturing is performed.

When the sound is determined to be related to the object, the attributes of the sound may not be varied.

Determining whether the sound is related to the object may be performed based on a distance between the electronic device and the object.

The method for processing the sound by the electronic device may further comprise determining whether at least one image obtained through a camera other than the camera includes a face, and when the at least one image obtained through the other camera module includes the face, recognizing a mouth portion of the face, wherein determining whether the sound is related to the object may be performed based on whether the mouth portion moves.

There is provided a machine-readable storage medium recording a program to execute a method for processing a sound by an electronic device, the method comprising capturing at least one image corresponding to an object using a camera functionally connected with the electronic device, obtaining a sound using at least one microphone functionally connected with the electronic device at least temporarily when the image is captured, determining whether the sound is related to the object, and when the sound is determined to be unrelated to the object, varying at least some attributes of the sound and storing in association with the at least one image.

At least a part of the device (e.g., modules or their functions) or method (e.g., operations) may be implemented as instructions stored in a non-transitory computer-readable storage medium e.g., in the form of a program module. The instructions, when executed by a processor (e.g., one of the aforementioned processors), may enable the processor to carry out a corresponding function. The non-transitory computer-readable storage medium may be the memory 130.

The non-transitory computer-readable storage medium may include a hardware device, such as hard discs, floppy discs, and magnetic tapes (e.g., a magnetic tape), optical media such as compact disc ROMs (CD-ROMs) and digital versatile discs (DVDs), magneto-optical media such as floptical disks, ROMs, RAMs, Flash Memories, and/or the like. Examples of the program instructions may include not only machine language codes but also high-level language codes which are executable by various computing means using an interpreter. The aforementioned hardware devices may be configured to operate as one or more software modules to carry out exemplary embodiments of the present disclosure, and vice versa.

Modules or programming modules in accordance herewith may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or omitted, or include other additional operation(s).

As is apparent from the foregoing description, in a method for processing sounds by an electronic device and the electronic device, the sound signal reception capability (e.g., accuracy or sensitivity) of the electronic device may be enhanced utilizing the sound receiving function of the speaker and/or receiver of the electronic device. Further, the front camera (camera facing the user) may be used to further enhance the sound signal reception capability of the electronic device. For example, the electronic device may adjust the balance in the sound strength upon video capturing or sound recording, thereby providing strength-balanced sound signals to the user.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. An electronic device, comprising:
a camera module; and
a processor configured to capture at least one image of an object using the camera module, obtain a sound using a microphone operably connected to the processor when the at least one image is captured, determine whether the sound is related to the object, when the sound is determined to be unrelated to the object, change at least one attribute of the sound and store the changed at least one attribute of the sound.

2. The electronic device of claim 1, wherein the processor is further configured to store visual information which is related to the sound.

3. The electronic device of claim 1, further comprising a memory for storing information corresponding to one of the at least one image, information corresponding to the sound, and visual information related to the sound.

4. The electronic device of claim 1, wherein the processor is further configured to determine a direction of the sound, and when it is determined that the sound is a sound coming from a direction from a rear surface of the camera module, determine that the sound is unrelated to the object.

5. The electronic device of claim 4, wherein the processor is further configured to determine the direction of the sound using a direction of arrival (DOA) estimation technique.

6. The electronic device of claim 4, wherein the processor is further configured to, when the direction of the sound is a first direction, assign the sound to a first sound channel of multiple sound channels, and when the direction of the sound is a second direction, assign the sound to a second sound channel of the multiple sound channels.

7. The electronic device of claim 1, wherein the microphone is functional as one of a speaker and a receiver.

8. The electronic device of claim 1, wherein the processor is further configured to, when the sound is determined to be related to the object, not change the at least one attribute of the sound.

9. The electronic device of claim 1, further comprising at least one sensor for obtaining a distance from an object corresponding to the sound, and wherein the processor is further configured to determine whether the sound is related to the object based on a distance between the electronic device and the object.

10. The electronic device of claim 1, further comprising another camera module, wherein the processor is further configured to determine whether the at least one image obtained through the another camera module includes a face, when the at least one image obtained through the another camera module includes the face, recognize a mouth portion of the face, and determine whether the sound is related to the object based on whether the mouth portion moves.

11. A method for processing a sound by an electronic device, the method comprising:
capturing at least one image of an object using a camera operably connected to the electronic device;
obtaining a sound using at least one microphone operably connected to the electronic device when the at least one image is captured;
determining whether the sound is related to the object; and
when the sound is determined to be unrelated to the object, changing at least one attribute of the sound and storing the changed at least one attribute of the sound.

12. The method of claim 11, further comprising storing visual information which is related to the sound.

13. The method of claim 11, wherein determining whether the sound is related to the object includes determining a direction of the sound, and when the sound is coming from a direction from a rear surface of the camera, determining that the sound is unrelated to the object.

14. The method of claim 13, wherein determining the direction of the sound includes using a direction of arrival (DOA) estimation technique.

15. The method of claim 13, further comprising, when a direction of the sound is a first direction, assigning the sound to a first sound channel of multiple sound channels, and when the direction of the sound is a second direction, assigning the sound to a second sound channel of the multiple sound channels.

16. The method of claim 11, wherein the microphone is functional as one of a speaker and a receiver, and wherein the method further comprises activating at least one of the speaker function and the receiver function of the microphone upon capturing the at least one image.

17. The method of claim 11, wherein when the sound is determined to be related to the object, the at least one attribute of the sound is not changed.

18. The method of claim 11, wherein determining whether the sound is related to the object is based on a distance between the electronic device and the object.

19. The method of claim 11, further comprising:
determining whether at least one image obtained through another camera includes a face; and
when the at least one image obtained through the another camera includes the face, recognizing a mouth portion of the face, and wherein determining whether the sound is related to the object is based on whether the mouth portion moves.

20. A non-transitory computer-readable storage medium having thereon a program that executes a method for processing a sound by an electronic device, the method comprising:
capturing at least one image of an object using a camera operably connected to the electronic device;
obtaining a sound using at least one microphone operably connected to the electronic device when the at least one image is captured;
determining whether the sound is related to the object; and
when the sound is determined to be unrelated to the object, changing at least one attribute of the sound and storing the changed at least one attribute of the sound.

* * * * *